(12) United States Patent
Ionescu

(10) Patent No.: US 6,842,494 B2
(45) Date of Patent: Jan. 11, 2005

(54) APPARATUS, AND ASSOCIATED METHOD, FOR FORMING A SYSTEMATIC, RECURSIVE, SPACE-TIME CODE

(75) Inventor: Dumitru Mihai Ionescu, Dallas, TX (US)

(73) Assignee: Nokia Corporation, Espoo (FI)

( * ) Notice: Subject to any disclaimer, the term of this patent is extended or adjusted under 35 U.S.C. 154(b) by 182 days.

(21) Appl. No.: 09/945,010

(22) Filed: Aug. 31, 2001

(65) Prior Publication Data

US 2003/0072381 A1 Apr. 17, 2003

(51) Int. Cl.[7] ............................................. H04L 27/00
(52) U.S. Cl. ................................................... 375/295
(58) Field of Search ................................. 375/130, 140, 375/141, 267, 295, 135, 146; 714/712, 746, 750, 6, 799, 800, 801; 455/101

(56) References Cited

U.S. PATENT DOCUMENTS

| | | | | |
|---|---|---|---|---|
| 6,044,083 A | * | 3/2000 | Citta et al. ................... 370/441 |
| 6,128,764 A | * | 10/2000 | Gottesman ................... 714/785 |
| 6,185,258 B1 | * | 2/2001 | Alamouti et al. ........... 375/260 |
| 6,241,778 B1 | * | 6/2001 | de Lind van Wijngaarden et al. .. 341/58 |
| 6,263,029 B1 | * | 7/2001 | Alard et al. ................. 375/340 |
| 6,452,981 B1 | * | 9/2002 | Raleigh et al. ............. 375/299 |
| 6,532,454 B1 | * | 3/2003 | Werbos ....................... 706/14 |
| 6,560,295 B1 | * | 5/2003 | Hammons et al. .......... 375/299 |
| 6,678,263 B1 | * | 1/2004 | Hammons et al. .......... 370/342 |
| 2002/0122502 A1 | * | 9/2002 | El-Gamal et al. ........... 375/267 |
| 2002/0136327 A1 | * | 9/2002 | El-Gamal et al. ........... 375/308 |

* cited by examiner

*Primary Examiner*—Mohammed Ghayour
*Assistant Examiner*—Dung X. Nguyen
(74) *Attorney, Agent, or Firm*—Federico Fraccaroli

(57) ABSTRACT

Apparatus, and an associated method, for encoding digital data to be communicated by a sending station, such as a base transceiver station of a cellular communication system. Space-time diversity is provided pursuant to the encoding, thereby to facilitate communication of data upon communication channels susceptible to fading conditions. A systematic and recursive space-time coder includes a coset selecting coder for forming coset addressing values used in connection to a multi-dimensional constellation. The coset addressing values are used by a signal entity selector to select a multi-dimensional constellation entity.

15 Claims, 4 Drawing Sheets

| i=0 ...7 | q 8 | q 16 | i=8 ...15 | q 8 | q 16 | i=16 ...23 | q 8 | q 16 | i=24 ...31 | q 8 | q 16 |
|---|---|---|---|---|---|---|---|---|---|---|---|
| [13]<br>[00] | $C_0$ 00 | $C_0$ 0 | [33]<br>[02] | $C_0$ 01 | $C_2$ 1 | [31]<br>[00] | $C_5$ 00 | $C_8$ 0 | [11]<br>[02] | $C_5$ 01 | $C_{10}$ 1 |
| [12]<br>[10] | $C_1$ 00 | $C_1$ 0 | [32]<br>[12] | $C_1$ 01 | $C_3$ 1 | [30]<br>[10] | $C_4$ 00 | $C_9$ 0 | [10]<br>[12] | $C_4$ 01 | $C_{11}$ 1 |
| [11]<br>[20] | $C_0$ 10 | $C_2$ 0 | [31]<br>[22] | $C_0$ 11 | $C_0$ 1 | [33]<br>[20] | $C_5$ 10 | $C_{10}$ 0 | [13]<br>[22] | $C_5$ 11 | $C_8$ 1 |
| [10]<br>[30] | $C_1$ 10 | $C_3$ 0 | [30]<br>[32] | $C_1$ 11 | $C_1$ 1 | [32]<br>[30] | $C_4$ 10 | $C_{11}$ 0 | [12]<br>[32] | $C_4$ 11 | $C_9$ 1 |
| [03]<br>[01] | $C_3$ 00 | $C_5$ 0 | [23]<br>[03] | $C_3$ 01 | $C_7$ 1 | [21]<br>[01] | $C_6$ 00 | $C_{13}$ 0 | [01]<br>[03] | $C_6$ 01 | $C_{15}$ 1 |
| [02]<br>[11] | $C_2$ 00 | $C_4$ 0 | [22]<br>[13] | $C_2$ 01 | $C_6$ 1 | [20]<br>[11] | $C_7$ 00 | $C_{12}$ 0 | [00]<br>[13] | $C_7$ 01 | $C_{14}$ 1 |
| [01]<br>[21] | $C_3$ 10 | $C_7$ 0 | [21]<br>[23] | $C_3$ 11 | $C_5$ 1 | [23]<br>[21] | $C_6$ 10 | $C_{15}$ 0 | [03]<br>[23] | $C_6$ 11 | $C_{13}$ 1 |
| [00]<br>[31] | $C_2$ 10 | $C_6$ 0 | [20]<br>[33] | $C_2$ 11 | $C_4$ 1 | [22]<br>[31] | $C_7$ 10 | $C_{14}$ 0 | [02]<br>[33] | $C_7$ 11 | $C_{12}$ 1 |

FIG. 5

APPARATUS, AND ASSOCIATED METHOD, FOR FORMING A SYSTEMATIC, RECURSIVE, SPACE-TIME CODE

The present invention relates generally to a manner by which to facilitate communication of data upon a communication channel susceptible to fading, such as a communication channel used during operation of a cellular, or other, radio communication system. More particularly, the present invention relates to apparatus, and an associated method, by which to encode data to form a codeword of a systematic, recursive, space-time code.

BACKGROUND OF THE INVENTION

Communication of data between remotely-positioned sending and receiving stations is a necessary adjunct of modern society. A wide variety of different types of communication systems have been developed and are regularly utilized to effectuate communication of data between the sending and receiving stations.

Advancements in communication technologies have permitted the development, and commercial implementation, of new types of communication systems. Radio communication systems are exemplary of communication systems which have benefited from the advancements in communication technologies. Improvements to existing types of radio communication systems as well as new types of radio communication systems have been made possible as a result of such advancements.

Modern wireless radio communication systems inherently permit increased communication mobility in contrast to the use of conventional wire line communication systems only. Communication channels between sending and receiving stations of a radio communication system are established via radio links formed therebetween. The communication channels are referred to as radio channels and do not require fixed connections for their formation.

The advancements in communication technologies include, for instance, the use of digital communication techniques. The use of digital communication techniques enables an increase in the communication capacity of a communication system, as well as an improvement in the quality levels of communications effectuated in the communication system.

Information to be communicated in a digital communication system is digitized. Once digitized, the digitized information is formatted, such as into data packets, and converted into a form to permit its communication upon the communication channel. In an ideal communication system, the data packets, subsequent to transmission upon the communication channel and reception at a receiving station, are essentially identical to the corresponding data packets prior to their communication upon the communication channel. In an actual communication system, however, distortion is introduced upon the data during its communication upon the communication channel such that the values of the representations of the data, when received at the receiving station, differ, in part, with the corresponding values of the data packets prior to its communication upon the communication channel. If the amount of distortion is significant, the informational content of the data cannot accurately be recovered at the receiving station.

Multipath transmission, for instance, causes fading of the received data energy. Such fading might alter the values of the symbols in a data packet, during transmission upon the communication channel. Quasistatic flat fading, for example, models a situation in which fading is flat in frequency and is constant over the duration of a relevant block of transmitted signals. In contrast, fast flat fading models a situation in which fading is flat in frequency but may change as fast as from a transmitted symbol epoch to a subsequent epoch. If the propagation distortion is not properly corrected, resultant communication quality levels of the communications are, at a minimum, reduced.

Various techniques are utilized to compensate for the distortion introduced upon the data as a result of communication of the data upon a non-ideal communication channel. Increasing the diversity of the data is utilized, for instance, to increase the likelihood that the informational content of the data can be recovered.

Redundancy in time of the data, prior to its communication, is referred to as creating time diversity. Encoding increases the redundancy of the data. Because of the increased redundancy, loss of portions of the data due, for example, to fading is less likely to prevent the recovery of the informational content of the data.

Space diversity is also utilized to compensate for distortion. Typically, space diversity refers to the utilization of more than one transmit antenna at a sending station at which to transduce the data. The antenna transducers are separated by distances great enough to ensure that the data communicated from the respective transducers fade in an uncorrelated manner. Fading of the data transmitted upon one propagation path to a receiving station is thereby less likely to fade in the same manner and at the same time as data communicated to a receiving station upon a different propagation path.

Space and time diversity are sometimes utilized together, thereby further to enhance diversity and better combat the signal fading caused, e.g., by multipath transmission.

Various coding techniques have been developed for use in transmit diversity schemes. Space-time codes have been developed to achieve diversity when transmitted upon fading channels by implementing redundancy at a sending station in both space and time. Systematic and recursive codes have also been developed. Systematic and recursive codes are advantageous in that parallel concatenation can be performed when data encoded in such manner is communicated. However, systematic and recursive, true space-time codes have generally not been available; systematic and recursive codes for transmit diversity have been obtained by straightforward extensions of, e.g., classical convolutional codes. If an improved, structured manner could be provided by which to form a systematic, recursive, space-time code, parallel concatenation of space-time codes could be performed in order to obtain richer configurations.

It is in light of this background information, related to communication of data upon a channel susceptible to fading, that the significant improvements of the present invention have evolved.

SUMMARY OF THE INVENTION

The present invention, accordingly, advantageously provides apparatus, and an associated method, by which to facilitate communication of data upon a communication channel susceptible to fading, such as a radio communication channel used during operation of a cellular, or other, communication system.

Through operation of an embodiment of the present invention, data is encoded to form a systematic, recursive, space-time code. Parallel concatenation of systematic, recursive, space-time codes is performable, and the parallelconcatenated space-time code is applied to a multiple antenna set to be transduced therefrom.

In one aspect of the present invention, apparatus is provided for a sending station operable to send a communication signal representative of data which is to be communicated to a receiving station. At the sending station, the data which is to be communicated is encoded by a space-time encoder which performs trellis coding of the data to form a space-time code representative of a coded representation of the data which is to be communicated. The encoder includes a recursive feedback path, and the encoder is constructed such that the space-time code formed thereat is both systematic and recursive. The space-time code is of characteristics to facilitate its communication upon communication channels having communication paths which exhibit fading.

The space-time code formed during operation of the space-time encoder is of symbol values which include values which are untransformed, but permutated, values of the data applied to the encoder. The space-time code further includes symbol values which are of values which are derived from values of the data applied to the space-time encoder.

In another aspect of the present invention, an encoder is provided which includes a coset selecting coder and a signal point selector. The coset selecting coder is coupled to receive at least a first set of input values that are to be encoded by the encoder. The coset selecting coder selects a coset of a chosen multi-dimensional constellation. Indications of the selected coset are provided to the signal point selector. The signal point selector is also coupled to receive another set of the input values. The signal point selector selects a multi-dimensional constellation point responsive to values of the coset and responsive to values of the input values provided thereto. The constellation point selected by the signal point selector forms a codeword which is a systematic, recursive, space-time code.

In one implementation, a systematic, recursive, eight-state, space-time encoder is provided. In another implementation, a systematic, recursive, sixteen-state, space-time encoder is provided. The space-time encoder is implemented, for instance, at a base transceiver station of a cellular, or other radio, communication system. When data to be communicated, such as data packets formed pursuant to effectuation of a packet-based communication service, recovery of the informational content of the data packets at a mobile station which receives the data packet is facilitated.

In these and other aspects, therefore, apparatus, and an associated method, is provided for a sending station operable in a communication system to send data upon a communication channel susceptible to fading. Data is placed in a form to facilitate communication thereof upon the communication channel. An encoder is coupled to receive first values representative of the data to be communicated upon the communication channel. The encoder encodes the first values representative of the data into encoded form as a codeword. The codeword forms a systematic recursive space-time code.

A more complete appreciation of the present invention and the scope thereof can be obtained from the accompanying drawings which are briefly summarized below, the following detailed description of the presently preferred embodiments of the invention, and the appended claims.

BRIEF DESCRIPTION OF THE DRAWINGS

FIG. 5 illustrates a table listing thirty-two matrices having entries representative of points of a 4-PSK (phase shift keying) constellation sent during operation of an embodiment of the present invention.

DETAILED DESCRIPTION

Figure 1:
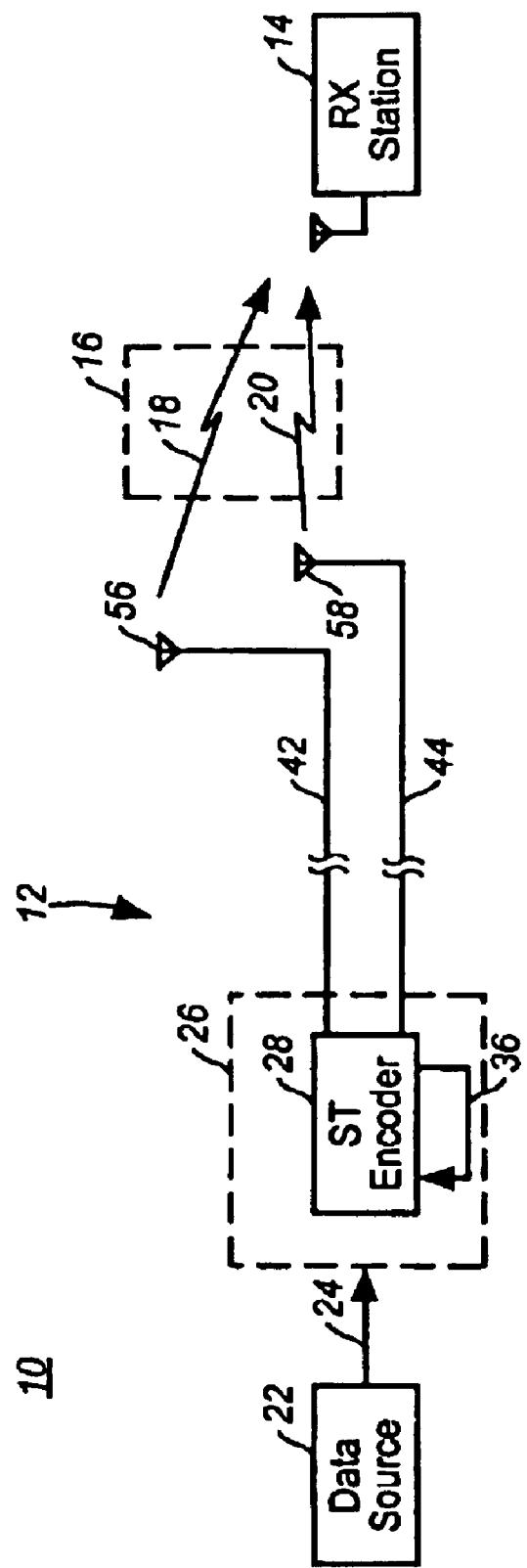
FIG. 1 illustrates a functional block diagram of a communication system in which an embodiment of the present invention is operable.

Referring first to FIG. 1, a communication system, shown generally at 10, is operable to communicate data between a sending station 12 and a receiving station 14 by way of a communication channel 16. The communication channel is susceptible to fading in manners which interfere with communication of the data between the sending and receiving stations.

In the exemplary implementation shown in the figure, the communication system 10, forms a communication system in which the sending station 12 forms a base transceiver station (BTS) of the cellular communication system, and the receiving station 14 forms a mobile station operable in the cellular communication system. The sending and receiving stations are interconnected by way of a communication link 16, here a radio link. Two exemplary communication paths, paths 18 and 20, are represented on the communication link. Communication channels are defined upon the communication link. The channels are susceptible to fading and distortion conditions.

While the following description shall describe operation of the communication system with respect to the exemplary implementation thereof as a cellular communication system, it should be understood that operation of an embodiment of the present invention is analogously also operable in any communication system to facilitate communication of data between a sending and a receiving station upon a communication channel which is susceptible to fading, or other distortion.

Here, data to be communicated by the sending station to the receiving station is sourced at a data source 22. The data source is representative of any data-type which is to be communicated by the sending station. Data generated by the data source comprises, for instance, data packets communicated pursuant to a GPRS (General Packet Radio Service) implemented in a GSM (Global System for Mobile Communications) cellular communication system.

Data sourced at the data source 22 is generated on the line 24 which is provided to the apparatus 26 of an embodiment of the present invention. The apparatus 26 includes an encoder 28, Data sourced at the data source 24 is applied directly to the encoder 28.

The encoder includes a feedback path 36 which forms a recursive path used during operation of the encoder.

The encoder 28 is operable to generate a systematic, recursive, space-time code on the output lines 42 and 44.

Because of the formation of a systematic, recursive, space-time codeword, the coded signal, formed, e.g., of successive codewords, can be applied to suitably-spaced apart antenna transducers, here the antenna transducers 56 and 58, to be transduced therefrom upon substantially uncorrelated communication paths to the receiving station 14. Once received at the receiving station, the informational content of the signal is more likely to be recoverable.

Figure 2:
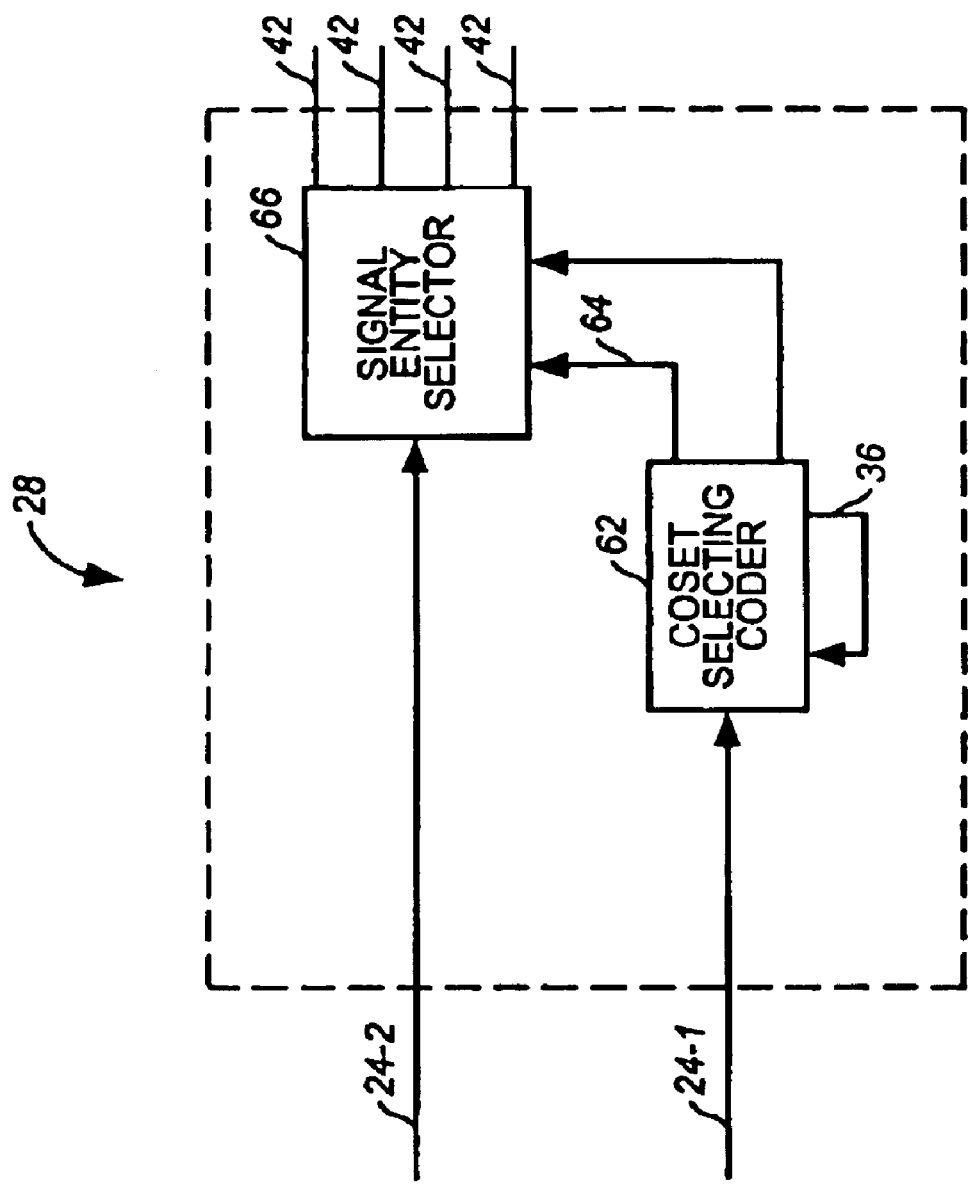
FIG. 2 illustrates a functional block diagram of an encoder of an embodiment of the present invention.

FIG. 2 illustrates the encoder 28 forming the apparatus of an embodiment of the present invention. The encoder is provided, by way of the lines 24, with input values that are to be encoded thereat. The input values are sourced at the data source 22 (shown in FIG. 1). Here, the lines 24 include a first set of lines 24-1 and a second set of lines 24-2. The number of lines forming the first and second sets are dependent upon the size of the encoder.

The first set of lines 24-1 are provided to a coset selecting coder 62. The coset selecting coder includes the feedback path 36 that provides for recursive operation of the coding performed by the encoder. The coset selecting coder operates to produce coset addressing values pertaining to a chosen multi-dimensional constellation and relevant to values provided thereto on the lines 24. In the exemplary implementation shown in the figure, only a first set of the lines 24-1 are provided to the coder. In another implementation, all of the input lines 24, i.e., both the first and second sets of lines 24, are provided to the coset selecting coder.

Values representative of the coset addressing values chosen by the coset selecting coder are provided, by way of the line 64, to a signal entity selector 66. The second set of lines 24-2, and the values generated thereon, are also provided to the signal entity selector. The signal entity selector selects a multi-dimensional constellation entity relevant to the values provided thereto on the lines 24-2 and 64. A binary representation of the constellation entity selected by the signal entity selector is generated in connection with lines 42. The constellation entity selected by the selector and generated on the lines 42 forms the codeword which belongs to a systematic, recursive, space-time code responsive to the values provided to the encoder on the lines 24. Subsequent transducing of the codeword by antenna transducers permits the codeword to be communicated upon the radio link extending to the receiving station (all shown in FIG. 1).

Figure 3:
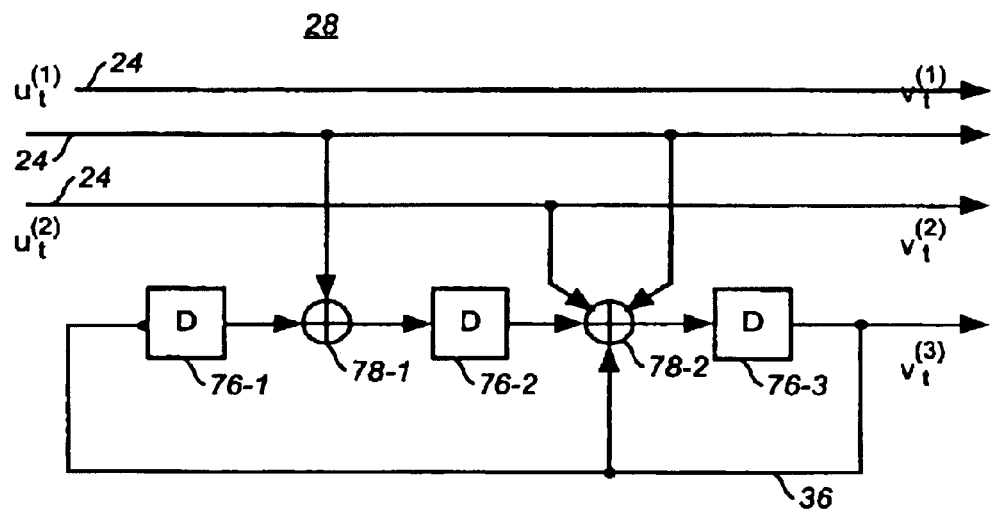
FIG. 3 illustrates a functional block diagram of a systematic, recursive, implementation of an eight-state, space-time encoder of an embodiment of the present invention.

FIG. 3 illustrates an implementation of the encoder 28 of an embodiment of the present invention, here an eight-state, space-time coder. Here, data to be encoded is provided to the encoder on the lines 24. The encoder includes three delay elements 76-1, 76-2, and 76-3, arranged in a series connection. The left-most (as shown) and the center (as shown) delay elements 76-1 and 76-2 are separated by a summing element 78. The summing element 78 is coupled to receive input values taken from a top-most (as shown) of the lines 24 and the left-most (as shown) delay element 76-1. The first summed value is provided between the delay elements 76-2 and 76-3. The summing element is additionally coupled to receive values generated on the lines 24 and also a branch taken from the recursive path 36. Coded symbol values are formed on the lines v which together define the systematic, recursive space-time code generated by the encoder.

Figure 4:
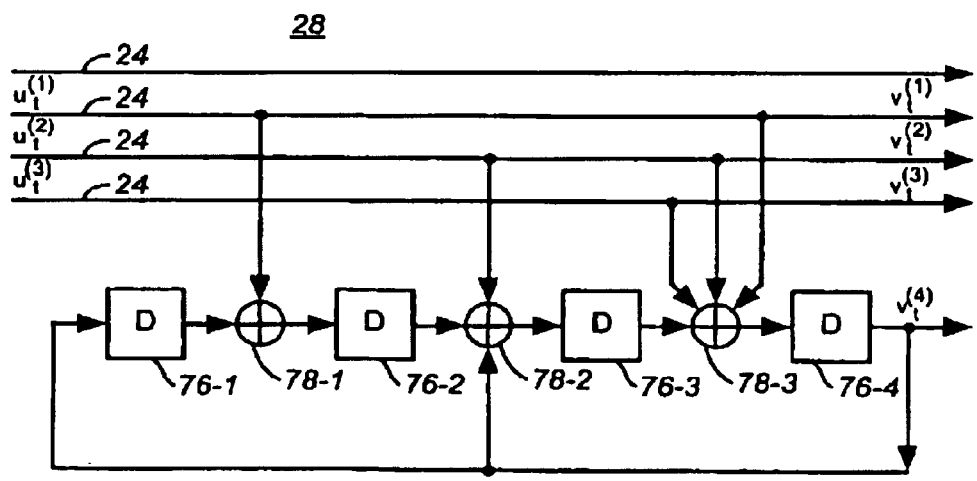
FIG. 4 illustrates a functional block diagram of a systematic, recursive, sixteen-state, space-time encoder of another embodiment of the present invention.

FIG. 4 illustrates the encoder 28 of another implementation. Here, the encoder forms a sixteen-state, space-time encoder. The lines 24 upon which the data sourced by the data source (shown in FIG. 1) is applied to the encoder by way of the lines 24. Four delay elements, elements 76-1, 76-2, 76-3, and 76-4, are here positioned in series connections. And, the recursive path 36 is here shown to extend between the delay element 76-4 and the delay element 76-1.

Three summing elements 78-1, 78-2, and 78-3, are positioned between successive ones of the delay elements. The delay elements 78-1 and 78-2 are further coupled to separate ones of the lines 24, and the summing element 78-2 is further coupled to the recursive path 36. And, the summing element 78-3 is coupled to several of the lines 24. The systematic, recursive space-time code formed by the encoder is provided on the lines v. Here, four lines v are utilized to permit the generation of a sixteen-state code.

Space-time coding performed by the encoders 28 of an embodiment provide a means for achieving diversity in fading channels by implementing both space and time redundancy at the transmitter. While space-time coding implies, in general, encoding both across time and across antennas, the encoders are here capable of constructing good trellis space-time codes in the setting when all transmit antennas use the same M-PSK complex modulator constellation M of unit average energy, and exactly $\log_2 M$ bits are transmitted during each multiple-channel use—i.e. coding redundancy is distributed in space. Extensions of the construction discussed herein to non-M-PSK constellations are natural.

A system with L transmit antennas and N receive antennas, designed so that fading across antennas be uncorrelated. In the exemplary implementation shown in the figure, two antenna transducers 56 and 58 are positioned at the sending station. Let l be the number of symbol epochs—with respect to an arbitrary transmit antenna-required to send a codeword. If l is regarded as the number of adjacent symbol epochs processed, to some extent, together with the detector, then a codeword is the concatenation of all symbols sent over all of the L antennas during the corresponding l consecutive symbol epochs; e.g., a generic codeword c starting at discrete time instance $[c^{(1)}_k c^{(2)}_k \ldots c^{(L)}_k c^{(1)}_{k+1} \ldots c^{(L)}_{k+1} \ldots c^{(1)}_{k+l-1} \ldots c^{(L)}_{k+l+1}]^T$, where $c^i_k$ is a complex symbol from M transmitted at discrete time instant k over transmit antenna i. A more meaningful representation for the codeword c is code matrix.

$$D_c = \begin{bmatrix} c_k^{(1)} & c_k^{(2)} & \cdots & c_k^{(L)} \\ \vdots & \vdots & \ddots & \vdots \\ c_{k+l-1}^{(1)} & c_{k+l-1}^{(2)} & \cdots & c_{k+l-1}^{(L)} \end{bmatrix}$$

For two codewords, c, e, let the code difference matrix b $D_{ec} = D_e - D_c$. Let any transmitted symbol have energy $E_s$. Let the sequence of channel attenuation coefficients between transmit antenna i and receive antenna j, denoted $\alpha_{ij}(\cdot)$ be white complex Gaussian with $$E\{|\alpha_{ij}'|^2\} = 1, \forall i, j.$$

Assume that each $\alpha_{ij}(\cdot)$ is constant over one frame (quasistatic flat fading) and that $\alpha_{ij}(\cdot)$ sequences are uncorrelated across antennas. Let $\gamma_k^{(i,j)} = \sqrt{E_s}\alpha_{ij}[k]$. At receive antenna j, the sampled version of the signal received during one frame is $$x_k^{(j)} = \sum_{i=1}^{L} \alpha_{i,j}[k] c_k^{(i)} \sqrt{E_x} + \eta_k^{(j)}, k = \kappa, \ldots, \kappa+l-1,$$

which becomes, in quasistatic fading, where $\eta_k^{(j)}$ is complex Gaussian noise with variance $N_0/2$ per dimension.

Conventionally, Pr(c, . . . ,e), the pairwise error probability (PEP)—of transmitting c and deciding in favor of e—is upper bounded via $Pr(c \to e) \leq (\Pi^r_{i=1} \lambda_i^{(c,e)})^{-N} (E_s/4N_0)_j^{-lN}$, where r and $\lambda_i(c,e)$ are, respectively, the rank and the nonzero eigenvalues of $D^\dagger_{ec} D_{ec}$. In quasistatic fading, the minimum—over all code word pairs—of the exponent rN of $E_S/N_0$ is the diversity gain, and the minimum over all c, e of $\Pi^r_{i=1}$ is coding gain; the maximization of each is deemed desirable, respectively, by the rank and determinant criteria.

In fast fading, the role of r is assumed by the symbol Hamming distance, while a product distance determines the coding gain in place of the eigenvalues product. Also conventionally, the determinant criterion can be strengthened by requiring that the eigenvalues of $D^\dagger_{ec} D_{ec}$ be as close to each other as possible, for any codeword pair c,e. It can be shown that this condition maximizes the product distance, given the Euclidean distance between c and e. This enhancement to the determinate criterion is applied to construct codes for space-time trellis coded modulation (STTCM), which use 4PSK constellations and send 2 b/s/Hz by encoding over two modulator symbol epochs at a time, similar to the approach taken in multiple trellis coded modulation.

The equal eigenvalue criterion states that in i.j.d. L-transmit-antenna Rayleigh fading with perfect channels state information, an upper bound to the PEP is made as small as possible if, for all pairs $D_c$, $D_e$, the Euclidean squared distance $str(D^\dagger_{ec}D_e)$ are made as large as possible and the non-square matrices $D_{ec}$ behave as unitary matrices-up to appropriate proportionality factors—in the sense that $D^\dagger_{ec}D_e=(tr\ D^\dagger_{ec}D_e)/L)I_L$. Suboptimal codes should be characterized by matrices $D^\dagger_{ec}D_e$ whose main diagonal elements are as close as possible both to each other and to $tr(D^\dagger_{ec}D_e)/L$, and for which the row-wise sum of the absolute values of the elements of the main diagonal is as small as possible for each row. Essentially, for any pair c,e, one should enlarge the Euclidean distance between c,e while rendering the eigenvalues of the square matrix $D^\dagger_{ec}D_e$ to be equal, or as close as possible; the latter is equivalent to $D^\dagger_{ec}D_e$ being as close to a diagonal matrix as possible. Necessarily, diversity is maximized in quasistatic fading (rank of $D^\dagger_{ec}D_e$ is L). The proportionality of $tr(D^\dagger_{ec}D_e)$ to the Euclidean distance between c and e is crucial for identifying a constellation partitioning that is characteristic of trellis coded modulation schemes.

In order to enforce the desirable equal singular value (ESV) structure to valid 1×L matrices $D_{ec}$ is sufficient to enforce it on submatrices. Suppose that L augmented 1. Let $D_c$, $D_e$, $D_{ec}$ be viewed as block vectors, i.e. (1/L)×1 matrices whose entries are L×L sub-matrices with elements from M. Then any code matrix can be regarded as a sequence of 1/L, L×L square sub-matrices, resulting from the unfolding of a trellis whose branches span, each, L modulator symbol epochs, with each branch labeled by a valid L×L sub-matrix. A path through the trellis is selected as a function of the current state and a block of new input symbols. The set of all L×L matrix building blocks can be regarded as a super-constellation. If these constituent blocks have the property that the Gram matrix of any valid pairwise differences is optimal—or close to optimal—then the properties mentioned above are transferred from $D_c$, $D_e$, $D_{ec}$. For L=2 and 4PSK, the 16 orthogonal complex matrices discussed in the existing art do have the aforementioned ESV structured for their pairwise differences. However, in order to achieve the desired $\log_2 M$ b/s/Hz one must have enough L×L constituent matrices in the super-constellation; this requires augmenting the optimal matrix set e.g., by a reflection of itself, to the effect that some code matrix pairs in the augmented set will not obey the ESV structure. The design goal is to ensure that different code matrices pertaining to an error event path (EEP) of length $k \leq k'$ transitions (kL modulator symbols) be optimal for k' as large as possible, and as close to optimal as feasible for k>k'. Note that Alamouti's transmit diversity scheme for L=2 transmit antennas can be used by simply appending, to any encoder's output, a mapper from encoded symbols to constellation points, followed by a Hurwitz-Radon transformer applied to two consecutive complex symbols. This provides only diversity gain and is not the approach taken herein. It is worth realizing that the Alamouti scheme with 4PSK and two transmit antennae over additive white Gaussian noise (AWGN) has the same bit error probability as uncoded 4 PSK in AWGN. In subsequent plots, Alamouti's scheme serves as a full-diversity, no coding gain reference.

Consider the L=2 case and assume that each transmit antenna uses 4PSK modulation; other M-PSK constellations can be accommodated using similar steps. A trellis coded modulation scheme with q states, where each trellis transition covers two symbols, can be obtained naturally by constructing a super-constellation whose points are 2×2 matrices chosen so as to facilitate the existence of the structure discussed above; the matrix elements are from 4PSK constellation and there must be enough super-constellation points to allow the transmission of 2 bits per channel use. Thirty-two matrices $C3_i$ defines the 4PSK symbols to be sent over the L=2 transmit antennae, during two consecutive symbol epochs. FIG. 5 illustrates a table listing thirty-two matrices having entries representative of points of a 4-PSK constellation. The squared Euclidean distance between $C_i$ and $C_j$ is $tr((C_i-C_j)+((C_i-C_j))$. The super-constellation will be partitioned in the usual way, producing cosets as a function of q. The elements within one coset are distinguished by means of uncoded bits.

Finally, the convolutional code selecting the cosets is described in terms of a matrix G, similar structure with the matrices used to describe the convolutional STCs. Comments on parallel transition follow. The following are true: the minimum Euclidean distance between any two branches leaving (arriving into) a given state is maximized. $D^\dagger_{ce}D_{ec}$ has equal eigenvalues for any $D_{ec}$ corresponding to EEPs of length $k \leq 2$ (i.e., up to four 4PSK symbols). And, the symbol Hamming distance between any two parallel transitions is 2, thereby the diversity is 2 in rapid fading. However, when the new 8- and 16-state STTCM codes are compared with, e.g., Tarokh's 16- and 32-state codes, respectively, the latter have a symbol Hamming distance of three hence higher diversity in rapid fading.

In the sequel, a frame has 130 symbols. 1, 2 compare the new STTCM codes with q=8 and q=16 states, in terms of average frame error probability (FEP), against Alamouti's scheme and several other trellis STCs having the same complexity as the relevant new STTCM code-all in quasi-static fading and at the same spectral efficiency of 2 b/s/Hz.

New 2 bit/s/Hz STCs designed for two transmit antennas with 4PSK constellations outperform known space-time codes of equal spectral efficiency and complexity in flat fading channels with no receive diversity (N=1).

The previous descriptions are of preferred examples for implementing the invention, and the scope of the invention should not necessarily be limited by this description. The scope of the present invention is defined by the following claims.

What is claimed:

1. Apparatus for a sending station operable in a communication system to send data upon a communication channel susceptible to fading, said apparatus for placing the data in a form to facilitate communication thereof upon the communication channel, said apparatus comprising:

an encoder adapted to receive first values representative of the data to be communicated upon the communication channel, said encoder having a systematic path and a recursive path responsive to which coded values are formed that are both systematic and recursive, the coded values used to select coded symbol values that belong to a systematic, recursive codeword that complies with an equal eigenvalue criterion.

2. The apparatus of claim 1 wherein the systematic, recursive codeword, into which said encoder encodes the first values representative of the data, includes at least a systematic part, and wherein the systematic part is formed of untransformed values of the first values representative of the data.

3. The apparatus of claim 1 wherein the systematic, recursive codeword of the systematic space-time code into which said encoder encodes the first values representative of the data includes parity values, the parity values being derived from the first values representative of the data.

4. The apparatus of claim 1 wherein the systematic, recursive codeword, into which said encoder encodes the first values representative of the data, comprises at least one systematic symbol value and at least one parity value.

5. The apparatus of claim 1 wherein the communication system comprises a radio communication system, wherein the sending station comprises a fixed-site transceiver, and wherein the systematic, recursive codeword constructed by said encoder is communicated by the fixed site transceiver upon a radio channel which forms the communication channel.

6. The apparatus of claim 1 wherein said encoder comprises a coset selecting coder coupled to receive at least one of the first values, said coset selecting coder for producing coset addressing values that comprise the coded values that are both systematic and recursive.

7. The apparatus of claim 6 wherein at least one part of the coset addressing values produced by said coset selecting coder comprises a parity value.

8. The apparatus of claim 6 wherein at least one part of the coset addressing values produced by said coset selecting coder comprises a non-derived value.

9. The apparatus of claim 6 wherein said encoder further comprises a signal entity selector coupled to said coset selecting coder, said signal entity selector for selecting a multidimensional constellation entity related to the coset addressing values produced by said coset selecting coder, a multi-dimensional constellation entity forming at least part of the systematic, recursive codeword.

10. The apparatus of claim 8 wherein said signal entity selector generates a binary representation of the multi-dimensional constellation entity.

11. The apparatus of claim 9 wherein said signal entity selector is further coupled to receive at least one of the first values and wherein the multi-dimensional constellation entity selected at said signal entity selector is further related to the at least one of the first values.

12. The apparatus of claim 11 wherein the at least one of the first values comprises a systematic part.

13. A method of communicating in a communication system having a sending station operable to send data upon a communication channel susceptible to fading, said method for placing the data in a form to facilitate communication thereof upon the communication channel, said method comprising:

applying values representative of the data to be communicated upon the communication channel to an encoder having a systematic path and a recursive path;

forming coded values responsive to application of the coded values during said operation of applying, the coded values both systematic and recursive; and forming a codeword of a recursive, systematic space-time code responsive to the coded values, the codeword complying with an equal eigenvalue criterion.

14. The method of claim 13 wherein said operations of forming comprise the operation of:

selecting coset addressing values; and thereafter selecting a multi-dimensional constellation entity related to the coset addressing values, the multi-dimensional constellation entity forming at least part of the codeword of the systematic recursive space-time code.

15. The method of claim 14 comprising the additional operation of representing the multi-dimensional constellation entity in binary form.

* * * * *